H. ROBINSON.
VEGETABLE PARING MACHINE.
APPLICATION FILED DEC. 24, 1914.

1,161,413.

Patented Nov. 23, 1915.

Witnesses

Inventor
Henry Robinson
by his Attorney

UNITED STATES PATENT OFFICE.

HENRY ROBINSON, OF SOUTH ORANGE, NEW JERSEY.

VEGETABLE-PARING MACHINE.

1,161,413.	Specification of Letters Patent.	Patented Nov. 23, 1915.

Application filed December 24, 1914. Serial No. 878,914.

*To all whom it may concern:*

Be it known that I, HENRY ROBINSON, a citizen of the United States, and resident of South Orange, in the county of Essex and State of New Jersey, have invented certain new and useful Improvements in Vegetable-Paring Machines, of which the following is a specification.

This invention relates to certain improvements in vegetable paring machines and more particularly to that type in which the paring or peeling operation is accomplished by the action of a high speed rotary abrasive member.

My invention relates more particularly to that type in which the rotary member is driven by an electric motor connected through suitable speed reducing gearing. Machines of this class are ordinarily handled by unskilled operators in the kitchens of hotels or restaurants whose carelessness often results in injury to the motor by water or rough handling, or in injury to the operators from the motor or gears.

My invention relates more particularly to the mounting of the motor and of the means for transmitting power from the motor to the rotary member of the machine.

By means of my invention, I seek to better protect the motor from the water used in the machine; render the motor more accessible for oiling and cleaning; protect the operator by mounting the motor out of the way; render the machine compact with the parts protected from breakage in shipment or rough-handling, and render the machine compact and properly balanced even though the motor be above the pan of the machine. Furthermore, by mounting the motor in accordance with my invention, the motor may be readily removed and replaced without dismantling the machine and the gear ratio may be very readily changed so as to drive the rotary member of the machine at the desired fixed speed. I seek to accomplish these results without requiring the addition of a number of parts and without increasing the expense of manufacture, or operation of the machine, or increasing the space required for the machine.

In the accompanying drawings, I have illustrated one form which my invention may assume, but I wish it understood that this constitutes only one embodiment of my invention and that various changes may be made in the details of construction and the arrangement of parts as defined in the appended claims.

Figure 1:
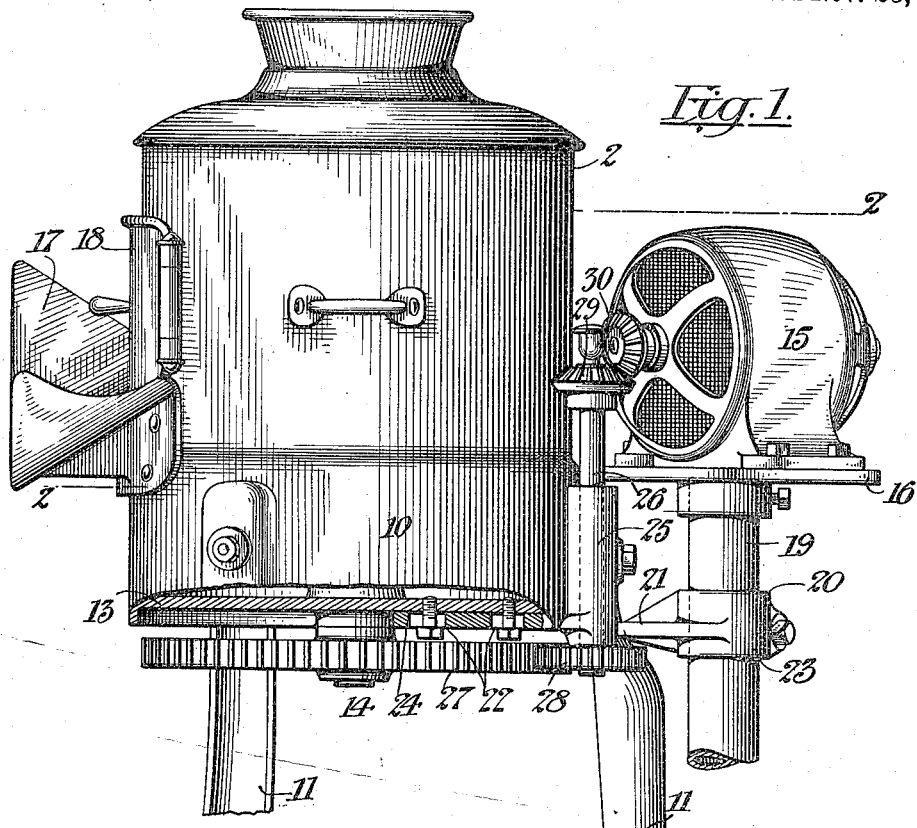
Figure 2:
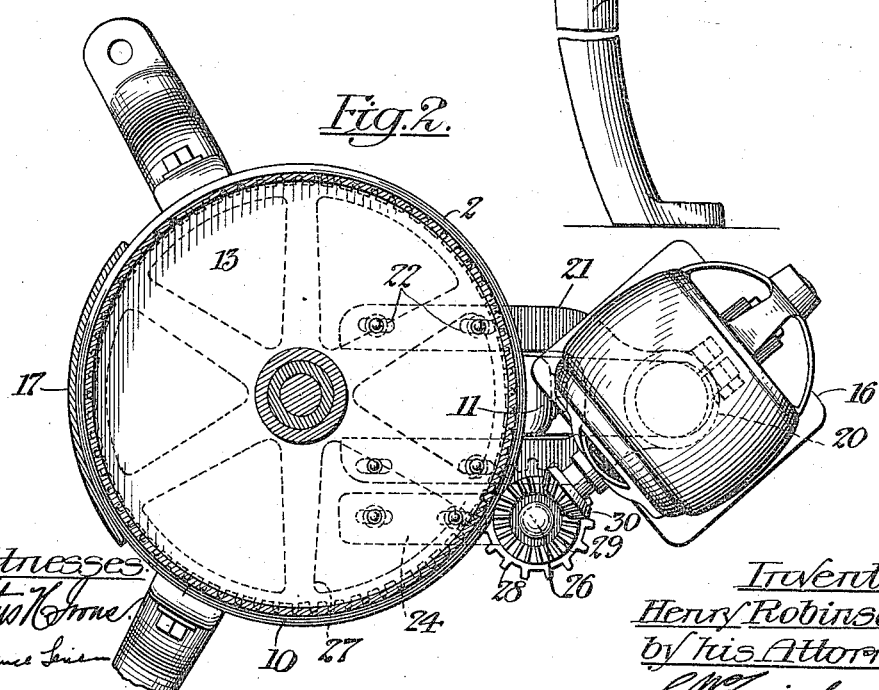

In these drawings, Figure 1 is a side elevation of a machine constructed in accordance with my invention, certain of the parts thereof being broken away, and Fig. 2 is a top plan view.

In these drawings I have illustrated my invention as applied to a machine having a main frame member or pan 10 supported upon suitable legs 11 and carrying a casing 12 constituting or including a container for the potatoes or other vegetables to be pared.

The details of construction of the machine itself form no portion of my present invention, although the machine is preferably of a type in which the bottom of the container constitutes a rotary abrasive member, said member being mounted above the bottom 13 of the pan and driven by a vertically disposed shaft 14 concentric with the pan and extending through a suitable bearing in the bottom of the latter. One such machine is disclosed in my prior Patent No. 942,932 granted December 14, 1909. My invention, as previously indicated, relates primarily to the means for driving this shaft and for supporting the driving means. As the source of power, I preferably employ an electric motor 15 and mount this motor upon a platform 16 disposed in the rear of the body portion of the machine and above the bottom of the pan 13. By the term "rear", I mean at the side opposite to the discharge chute 17 and outlet door 18 of the machine, so that it will be at the opposite side from the operators using the machine. Of course I may mount it on any other side of the machine should occasion render such mounting desirable. As shown, the platform 16 is carried by and constitutes a top for a standard 19 which latter is shown as being carried by a bracket 20. The bracket is illustrated as having two branches 21, 21, substantially parallel and adapted to extend beneath the bottom of the pan upon opposite sides of one of the legs 11 and to be rigidly clamped to the bottom of the pan or to some other suitable portion of the frame of the machine. The securing means may be of any desired character, but is preferably such as will permit an adjustment of the bracket longitudinally and radially of the body of the machine. As shown, each bracket has two slots 22 therein through which bolts may extend into threaded apertures in the bottom of the frame of the machine. The bracket at its outer end includes a bearing, boss, or collar 23 with a vertically disposed opening, through which the standard 19 extends, the latter being preferably in the form of a piece of piping. By means of a set screw, lock nut, or any other suitable device, the standard may be held rigid in respect to the bracket and may be adjusted either about its own axis or vertically.

Adjacent to the bracket 20 I provide a second bracket having an arm 24 similar to one of the two branches 21 of the bracket 20 and this arm is also provided with slots 22 so that it may be rigidly clamped to the under side of the frame but with an adjustment in a direction substantially parallel to the direction of adjustment of the bracket 20. The second bracket, at its outer end, carries a sleeve 25 constituting a bearing for a vertically disposed shaft 26. This shaft constitutes the intermediate driving shaft for transmitting the power from the motor to the rotary abrasive element of the machine. As shown, the shaft 14 of the machine has a large gear 27 at its lower end and below the pan, and meshing with a pinion 28 upon the lower end of the shaft 26. At the upper end of the shaft is a bevel pinion 29 meshing with a bevel pinion 30 on the armature shaft of the motor. By means of this construction, the motor may be brought close to the side of the casing but out of the way of the operators and above the pan, and any water which might leak therefrom.

In securing the desired gear ratio so that the abrasive element may be driven at the proper speed, it is only necessary to remove the pinion 28 and replace it by a larger or smaller one. The two brackets may be adjusted outwardly or inwardly to the desired extent so as to avoid the necessity of making any changes in the bevel pinions 29 and 30 and so as to bring the pinion 28 into mesh with the gear 27, irrespective of the size of the former.

By providing the machine with three downwardly diverging or spreading legs and by making the two branches of the bracket 20 extend along opposite sides of the rear leg, the weight of the motor comes inside of the rear point of support and therefore the machine is stable and not easily overturned. I of course do not desire to be limited to the specific form of bracket or to the mounting of the bracket directly adjacent to one of the legs, as a larger number of legs may be employed on the machine and the bracket may be secured to the frame or to a leg irrespective of the position or number of the legs.

In Fig. 1, I have shown the lower end of the standard 19 broken away. It is of course evident that the standard may terminate at the point shown or may, if desired, extend down to the floor and may constitute an additional support or the sole support for the motor. In the latter case, the bracket 20 may merely insure the proper position of the motor support in respect to the machine without bearing any of the weight of the motor.

Having thus described my invention, what I claim as new and desire to secure by Letters Patent is:

1. In a vegetable paring machine, the combination of a body portion, a shaft projecting upwardly through said body portion, a gear wheel on the lower end of said shaft, a bracket secured to the under side of said body portion and projecting horizontally beyond the side thereof, an electric motor attached to said bracket and an intermediate vertically disposed shaft driven from said motor and having a pinion at its lower end meshing with said gear.

2. In a vegetable paring machine, the combination of a body portion, a shaft projecting upwardly through the bottom thereof, a gear wheel on the lower end of said shaft, a bracket secured to the under side of said body portion and projecting horizontally beyond the side thereof, an electric motor attached to said bracket, a vertically disposed shaft driven from said motor and having a pinion at its lower end meshing with said gear, and means for supporting said shaft and permitting of the lateral adjustment thereof.

3. In a vegetable paring machine, the combination of a body portion, legs for supporting said body portion, a driving gear beneath said body portion, an electric motor supported at one side of said body portion, a vertically disposed shaft attached to said body portion, gears for driving said shaft from said motor and a pinion at the lower end of said shaft and meshing with said first mentioned gear.

4. In a vegetable paring machine, the combination of a body portion, an electric motor supported above the bottom of said body portion, a gear beneath said body portion and concentric therewith for operating the machine, a vertically disposed shaft supported at one side of said body portion, a gearing at the upper end of said shaft for connecting said motor to said shaft and a gear at the lower end of said shaft meshing the said first mentioned gear.

5. In a vegetable paring machine, the combination of a body portion, two brackets extending outwardly from the lower portion thereof, an electric motor carried by one of said brackets, adjacent to the side of the machine, a vertical shaft carried by the other of said brackets, means for transmitting power from said motor to the upper end of said shaft and means for transmitting power from the lower end of said shaft to the mechanism of the machine.

6. In a vegetable paring machine, the combination of a body portion, two brackets extending outwardly from the lower portion thereof, an electric motor carried by one of said brackets, a vertical shaft carried by the other of said brackets, means for transmitting power from said motor to the upper end of said shaft, and means for transmitting power from the lower end of said shaft to the mechanism of the machine, said brackets being adjustable horizontally to vary the position of said motor and said shaft in respect to said body portion.

7. In a vegetable paring machine, the combination of a body portion, a plurality of legs supporting the same, a bracket including spaced branches upon opposite sides of one of said legs and secured to the underside of said body portion, an electric motor carried by said bracket, and means for transmitting power from said motor to the mechanism of the machine, the leg between said branches having its lower end disposed beneath said motor.

8. In a vegetable paring machine, the combination of a body portion, two brackets extending outwardly from the lower portion and each adjustable horizontally in the same direction and each terminating in a bearing, a vertically disposed shaft carried in the bearing of one of said brackets, a standard carried in the bearing of the other bracket, an electric motor carried by said standard, means for transmitting power from said motor to one end of said shaft and means for transmitting power from the other end of said shaft to the mechanism of the machine.

Signed at New York city in the county of New York and State of New York this 22nd day of December, A. D. 1914.

HENRY ROBINSON.

Witnesses:
　HARRY DAVIDSON,
　CHAS. J. SCHEIB.

Copies of this patent may be obtained for five cents each, by addressing the "Commissioner of Patents, Washington, D. C."